Oct. 11, 1932.  A. F. WEISS  1,882,350
POWER POSTHOLE AUGER
Filed April 20, 1931   2 Sheets-Sheet 1
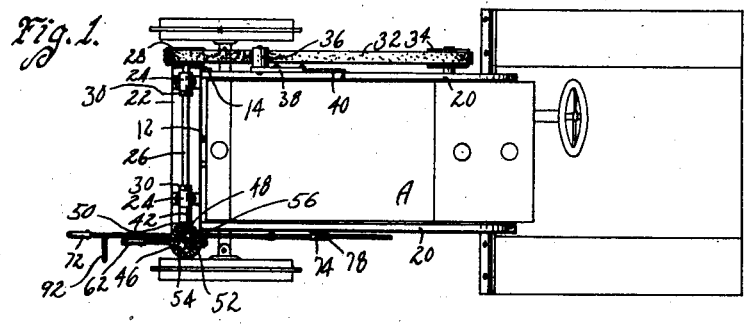
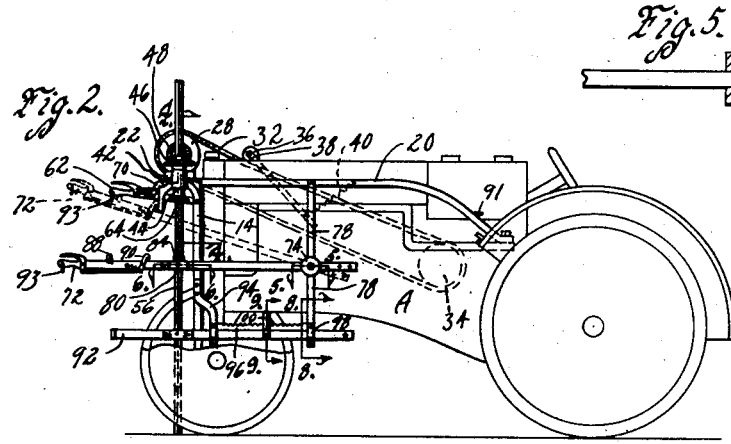
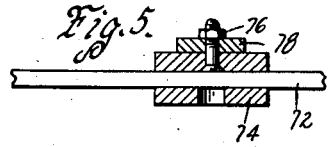
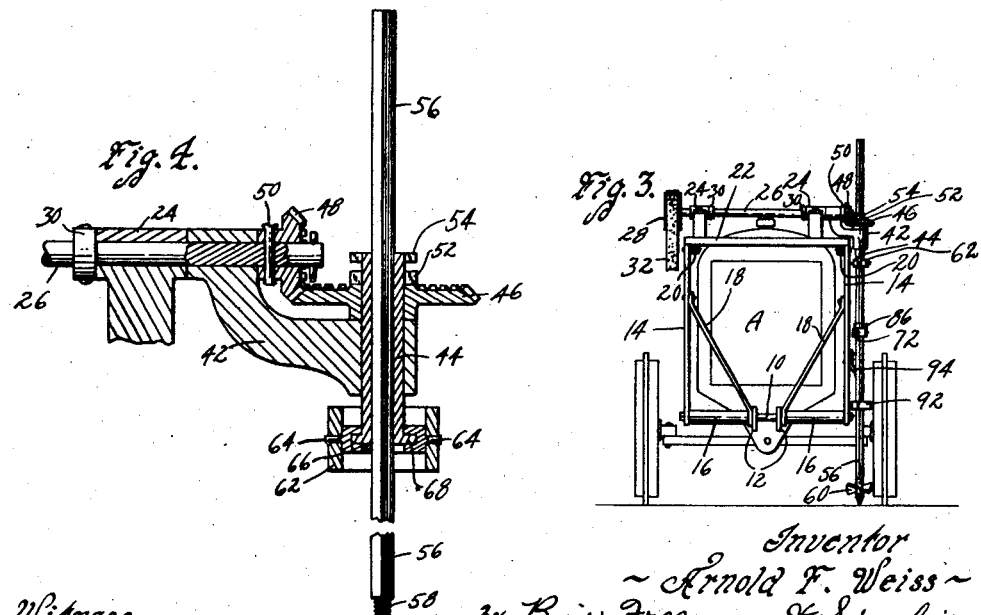
Witness
H. S. Wingenmaier
Inventor
Arnold F. Weiss
By Bair, Freeman & Sinclair
Attorneys Oct. 11, 1932.　　　A. F. WEISS　　　1,882,350
POWER POSTHOLE AUGER
Filed April 20, 1931　　2 Sheets-Sheet 2
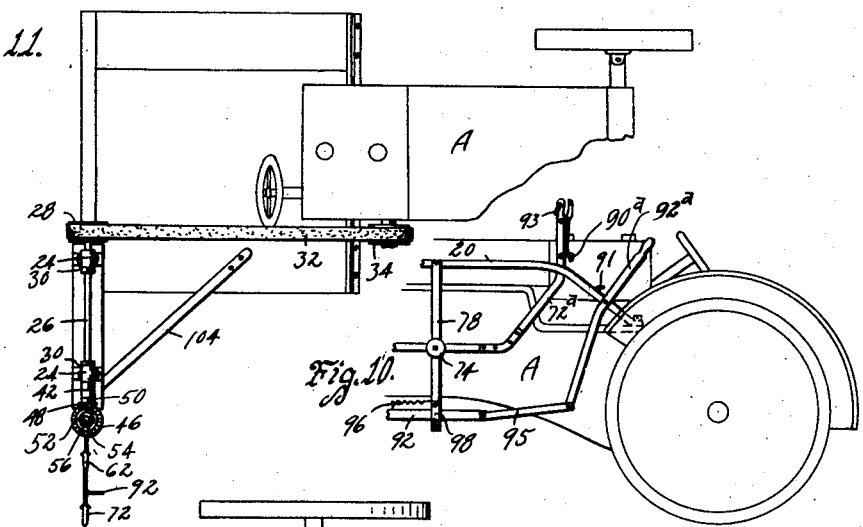
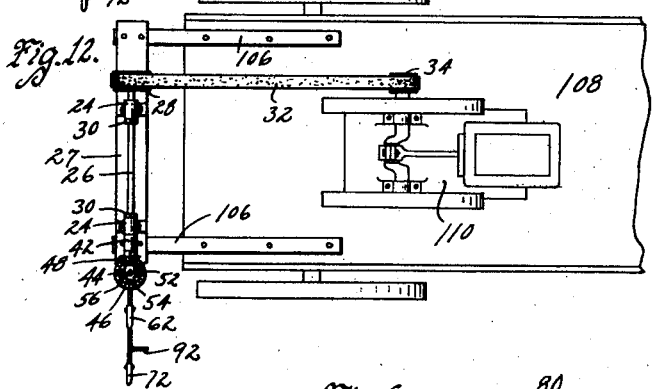
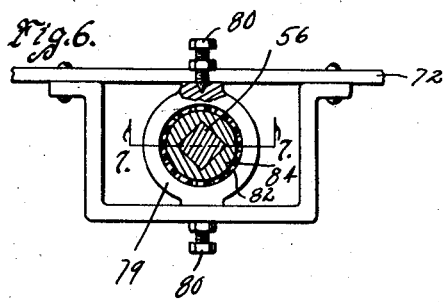
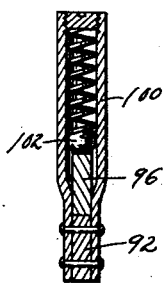
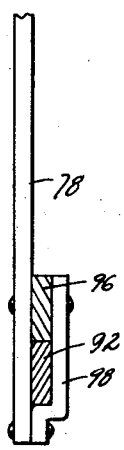
Witness
H. S. Munzenmaier
Inventor
Arnold F. Weiss
by Bair, Freeman & Sinclair
Attorneys Patented Oct. 11, 1932

1,882,350

UNITED STATES PATENT OFFICE

ARNOLD F. WEISS, OF HUMBOLDT, IOWA

POWER POSTHOLE AUGER

Application filed April 20, 1931. Serial No. 531,272.

The object of my invention is to provide a power post hole auger which is simple, durable and comparatively inexpensive to manufacture.

A further object of my invention is to provide a power post hole auger which can be mounted on a tractor, either at the front or rear end thereof and powered by the engine of the tractor or which can be mounted on a wagon or other vehicle and powered by an electric motor or gasoline engine or the like.

A further object is to provide a power post hole auger which may conveniently be mounted on a tractor or other vehicle in such manner that it can be adjusted as to inclination with respect to the vehicle, there being provided a conveniently operable means for affecting and retaining such adjustment.

A further object is to provide conveniently accessible clutch means to control the operation of the auger and to further provide a feed lever for feeding the auger into the ground, the feed lever being arranged to engage the clutch means for disengaging it and thereby stopping rotation of the auger whenever the auger is moved by the feed lever to raised position.

Still a further object is to provide extension controls for the auger so that it can be operated from the driving platform of the tractor.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of my invention showing it applied to the front end of a tractor.

Figure 2 is a side elevation of the same.

Figure 3 is a front elevation of the tractor and power post hole auger.

Figure 4 is an enlarged sectional view on the line 4—4 of Figure 2 illustrating the clutch mechanism.

Figure 5 is an enlarged sectional view on the line 5—5 of Figure 2 illustrating part of the feed lever.

Figure 6 is a sectional view on the line 6—6 of Figure 2 illustrating further details of the feed lever.

Figure 7 is a sectional view on the line 7—7 of Figure 6 illustrating a bearing connection.

Figure 8 is a sectional view on the line 8—8 of Figure 2 illustrating a sliding bar for adjusting the inclination of the auger.

Figure 9 is a sectional view on the line 9—9 of Figure 2 illustrating means for retaining the last mentioned adjustment.

Figure 10 is a side elevation of part of the mechanism showing extension controls for the purpose of operating the auger from the driving platform of the tractor.

Figure 11 is a plan view of a tractor and a power post hole auger, showing the auger mounted on the rear of the tractor; and Figure 12 is a plan view showing it mounted on a wagon.

On the accompanying drawings, I have used the reference character A to indicate generally a tractor. My power post hole auger includes suitable framework mounted on the tractor which, as shown on the drawings, consists of a mounting rod 10 extended through draw bar ears 12 of the tractor and connected with uprights 14. Tubular spacers 16 and brace bars 18, if desired, constitute further mechanism of the framework. The uprights 14 are connected with side frames 20 which extend rearwardly and may be connected with any suitable part of the tractor.

Supported on the side frames 20 is a plank or the like 22 having bearings 24 extending upwardly therefrom. A drive shaft 26 is journalled in the bearings 24. A drive pulley 28 is secured to the drive shaft 26. Collars 30 prevent longitudinal movement of the shaft 26 relative to the bearings 24.

By means of a belt 32, the drive pulley 28 is operatively connected with a power pulley 34 of the tractor. An idler pulley 36 is carried by an arm 38, which is pivoted to one of the side frames 20. The idler pulley 36 engages the belt 32 and is actuated by a spring 40 to cause the idler pulley to act as a belt tightener. Rotatable on the drive shaft 26 is an angle bearing 42 (see Figure 4). A sleeve 44 is rotatable and slidable through the bearing 42 and has a bevel gear 46 rotatable thereon. A bevel pinion 48 meshes with the bevel gear 46 and is operatively connected with the drive shaft 26 by a break pin 50 of wood or the like.

Clutch lugs 52 are formed on the bevel gear 46 with which clutch lugs 54 on the upper end of the sleeve 44 are adapted to coact when the sleeve is in a lowered position. The inside of the sleeve 44 is either angular or is provided with a key and an auger shaft 56 extends therethrough and is slidable, but non-rotatable relative thereto. The lower end of the auger shaft 56 is screw-threaded, as indicated at 58 and any desired type of auger 60 may be secured thereto. By means of the screw-threaded connection at 58, one auger may be substituted for another, if desired. For engaging and separating the clutch lugs 52 and 54, I provide a clutch lever 62 which has pivoted therein, by pins 64, a collar 66. The collar 66 engages an annular flange 68 on the lower end of the sleeve 44. Gravity acting upon the clutch lever 62 will normally engage the clutch lugs 52 and 54. They may be retained in disengaged position by a latch 70, which normally engages over a stationary lug extending from the bearing 42, as shown in Figure 2.

For imparting longitudinal movement to the auger shaft 56 for thereby feeding the auger into the ground, I provide a feed lever 72. The feed lever 72 is slidable through a block 74 (see Figure 5) which is pivoted by a bolt 76 to a brace bar 78.

The feed lever 72 carries a bearing cage 79, which is pivoted on screws 80. The bearing cage surrounds an annular row of ball bearings 82, which are seated on a hub 84. The hub 84 is secured to the auger shaft 56 by a set screw 86, whereby it can be adjusted to any position thereon desired. It will be obvious that up and down movement of the feed lever 72 will cause up and down movement of the auger shaft 56, the sliding connection between the feed lever and the block 74 permitting pivotal movement with respect to the bolt 76 without binding.

The feed lever 72 is provided with a lug 88 adapted to engage the clutch lever 62 and raise it to disengaged position whenever the feed lever is raised, for drawing the auger out of the post hole which is being dug. By means of a latch 90, which engages a lug on the bearing 42, as shown by dotted lines in Figure 2, the auger can be retained in raised position.

The angle bearing 42 permits changing the inclination of the auger shaft about the drive shaft 26 as a pivot. An inclination adjusting lever 92 is provided which has a bearing construction similar to that shown in Figures 6 and 7 except that the hub 84 is not secured to the auger shaft, but is slidable thereon. The lever 92 is slidable with respect to the lower end of the bar 78 and with respect to a bar 94, which are connected together by a toothed bar 96.

Brackets 98 (see Figure 8) connected with the bars 78, 94 and 96, provide guideways for the sliding bar 92. The sliding bar 92 has secured thereto an upstanding tubular extension 100 in which is housed a spring pressed ball 102. The ball 102 engages the teeth on the upper edge of the toothed bar 96, whereby to retain the sliding bar 92 in any position to which it is adjusted.

As shown in Figure 10, the feed lever 72 may have an extension 72a secured to the rear end thereof for extending the controls of the power post hole auger to the driving platform of the tractor A. A latch 90a may coact with a lug 91 for retaining the auger in raised position. The extension lever 72a, the feed lever 72 and the clutch lever 62 each have a small wire loop 93 whereby the latch 90a may be rendered ineffective when operating the auger from the front of the tractor or the latches 70 and 90 may be rendered ineffective when operating the auger from the driving platform of the tractor.

The sliding lever 92, for adjusting the inclination of the auger, can be controlled by a pivoted lever 92a and a link 95.

In Figure 11, I have shown the supporting plank 27 mounted on the rear end of a tractor and suitably braced by a brace 104. Thus it will be seen that my device may be located anywhere on the tractor and can still be operated from the power plant of the tractor by belt or other suitable transmission. In Figure 12, I have shown the support 27 mounted on beams 106, which are secured to the bed 108 of a wagon.

An engine is indicated at 110 mounted also on the bed of a wagon and operatively connected with the auger mechanism. In either of the three types of mountings shown, the auger can be suitably inclined inasmuch as the bevel gear connections are provided. Each installation can be provided with similar controls which could be slightly modified, depending on constructional details of the mounting.

Other changes may also be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a power post hole auger, an auger shaft, a sleeve slidable and non-rotatable thereon, a bearing for said sleeve, auger drive means rotatable on said sleeve, said means and said sleeve having lugs to coact with each other when the sleeve is slid to a predetermined position, a clutch lever for sliding said sleeve, a feed lever for imparting longitudinal movement to said auger shaft and means on said feed lever to engage said clutch lever and move it to disengaged position when the feed lever assumes a predetermined position.

2. In a power post hole auger, an auger shaft, a sleeve slidable and non-rotatable thereon, a bearing for said sleeve, auger drive means rotatable on said sleeve, said means and said sleeve having lugs to coact with each other when the sleeve is slid to a predetermined position, a clutch lever for sliding said sleeve, a feed lever for imparting longitudinal movement to said auger shaft, means on said feed lever to engage said clutch lever and move it to disengaged position when the feed lever assumes a predetermined position and latch means for retaining the feed lever in said last mentioned position.

3. In a power post hole auger, an auger shaft, means for imparting rotation thereto, clutch control means therefor, a pivoted block and a feed lever slidable therethrough, said auger shaft rotatably and non-slidably coacting with said feed lever, said feed lever being arranged to engage said clutch control means and move it to disengaged position when the feed lever is in raised position.

4. In a power post hole auger, an auger shaft at the front end of a tractor, a clutch lever and a feed lever therefor, said feed lever being arranged to engage said clutch lever and move it to disengaging position when the feed lever is in position for raising the auger shaft.

5. In a power post hole auger, an auger shaft at the front end of a tractor, a clutch lever and a feed lever therefor, said feed lever being arranged to engage said clutch lever and move it to disengaging position when the feed lever is in position for raising the auger shaft and extension means on the feed lever whereby it can be operated from the driving platform of the tractor.

6. In a power post hole auger device, a frame, means pivotally and slidably mounting a normally vertical auger shaft thereon for swinging movement to a position at an angle relative to the vertical, means for imparting rotation thereto, a block pivoted to said frame at a point spaced from said auger shaft, a feed lever, means rotatably and non-slidably connecting said auger shaft with said feed lever, said feed lever being slidably mounted in said pivoted block to permit swinging of the auger shaft from vertical position and also to permit sliding movement of the auger shaft relative to said frame.

7. In a power post hole auger, a swingably mounted auger shaft and means for swinging said auger shaft and thereby adjusting its inclination, said means comprising a slidable bar, means slidably and rotatably connecting said auger shaft with said slidable bar and means comprising a fixed notched bar and a spring pressed ball coacting with each other for retaining said slidable bar in adjusted positions.

ARNOLD F. WEISS.